[19] United States Patent

Brogdon et al.

[11] 4,306,837

[45] Dec. 22, 1981

[54] BEARINGLESS TAIL ROTOR FOR HELICOPTERS

[75] Inventors: Vas H. Brogdon; Cecil E. Covington; Richard E. Wheelis, all of Hurst, Tex.

[73] Assignee: Textron, Inc., Providence, R.I.

[21] Appl. No.: 32,763

[22] Filed: Apr. 24, 1979

[51] Int. Cl.³ .............................................. B64C 27/38
[52] U.S. Cl. ................................. 416/134 A; 416/141; 416/230
[58] Field of Search ............... 416/134 A, 141, 230 A, 416/226

[56] References Cited

U.S. PATENT DOCUMENTS

| 3,457,997 | 7/1969 | Mackenzie et al. | 416/205 X |
| 3,754,840 | 8/1973 | Zincone | 416/230 A X |
| 3,765,267 | 10/1973 | Bourquardez et al. | 416/131 X |
| 3,782,856 | 1/1974 | Salkind et al. | 416/230 A X |
| 3,790,302 | 2/1974 | Pascher | 416/134 A |
| 3,874,815 | 4/1975 | Baskin | 416/134 A |
| 3,880,551 | 4/1975 | Kisovec | 416/134 A |
| 3,999,887 | 12/1976 | McGuire | 416/134 A |
| 4,047,839 | 9/1977 | Ferris et al. | 416/134 A |
| 4,077,740 | 3/1978 | Sobey | 416/230 A |
| 4,110,056 | 8/1978 | Stevenson | 416/230 A |

Primary Examiner—Everette A. Powell, Jr.
Attorney, Agent, or Firm—Richards, Harris & Medlock

[57] ABSTRACT

A helicopter tail rotor structure includes a thin, flat, tension-bearing strap of fibers extending spanwise, and is to be centrally secured by a hub to a helicopter tail mast. Flex sections are formed inboard of substantially equally divided portions of said fibers which extend as top and bottom blade spars from the outboard margins of the flex sections. Preferably, the planes of the flex sections and the planes of the spars are oriented at predetermined nose-up twist angles, one relative to the other.

8 Claims, 7 Drawing Figures

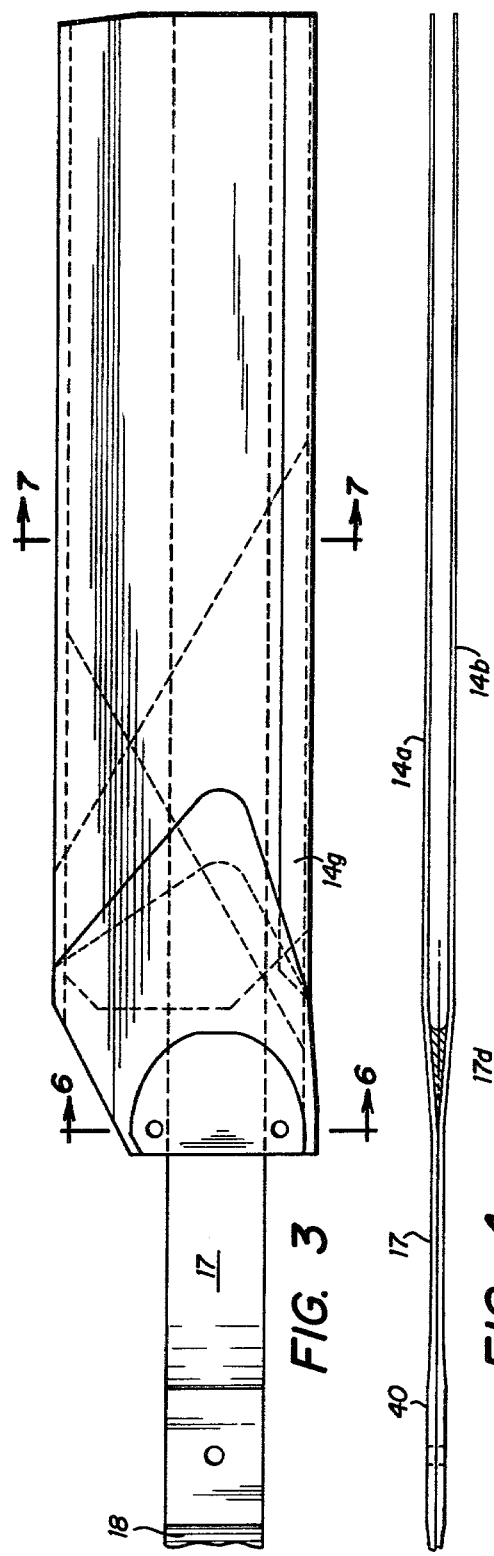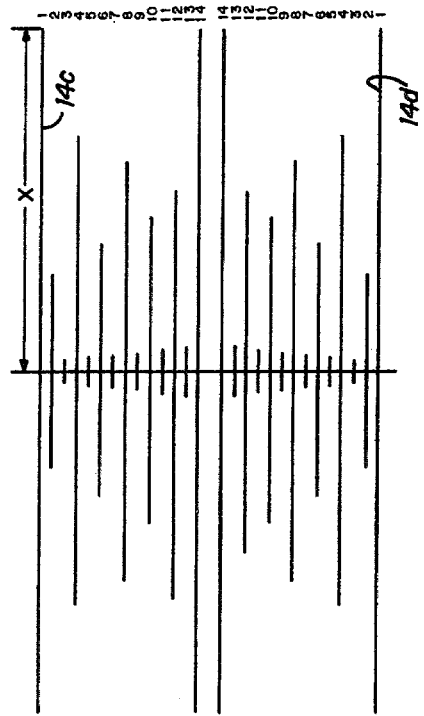
FIG. 3
FIG. 4
FIG. 5

4,306,837

BEARINGLESS TAIL ROTOR FOR HELICOPTERS

TECHNICAL FIELD

This invention relates to a bearingless tail rotor for a helicopter and, more particularly, to a construction which minimizes cost and enhances reliability.

Certain aspects of the controls for the rotor disclosed herein are described and claimed in copending application Ser. No. 32,785, filed Apr. 24, 1979, entitled "Twist Control for Helicopter Tail Rotor Pitch Change".

BACKGROUND ART

Rotary wing systems with conventional tail rotors employ bearings which lower the reliability and increase the maintainability and life cycle costs to undesirable levels. Heretofore, a tail rotor having an elastic pitch beam has been tested, but encountered instability in the cyclic mode involving primarily flapping/chord bending. There exists a need for a composite tail rotor which eliminates pitch change bearings and which eliminates an instability heretofore encountered between flapping and first chord natural frequencies and in which there is achieved a separation between the first torsion and second beam natural frequencies.

DISCLOSURE OF THE INVENTION

In accordance with the present invention, there is provided a bearingless tail rotor wherein a thin flat strap of spanwise-extending tension-bearing fibers is adapted to be secured in a hub of a helicopter tail mast system and extends radially from the axis of the tail rotor mast to form flex sections. It further extends, after substantially equal vertical division, to form top and bottom spars of blade portions unitarily formed with and extending beyond the flex sections.

Preferably the blades are pretwisted in nose up sense relative to the plane of the flex sections.

BRIEF DESCRIPTION OF DRAWINGS

FIG. 3 is a plan view of a portion of the rotor of FIGS. 1 and 2;

FIG. 4 is a side view of the spar system of the blade of FIGS. 1-3;

FIG. 5 is a drawing showing the schedule of strap layup sequences;

DETAILED DESCRIPTION

Figure 1:
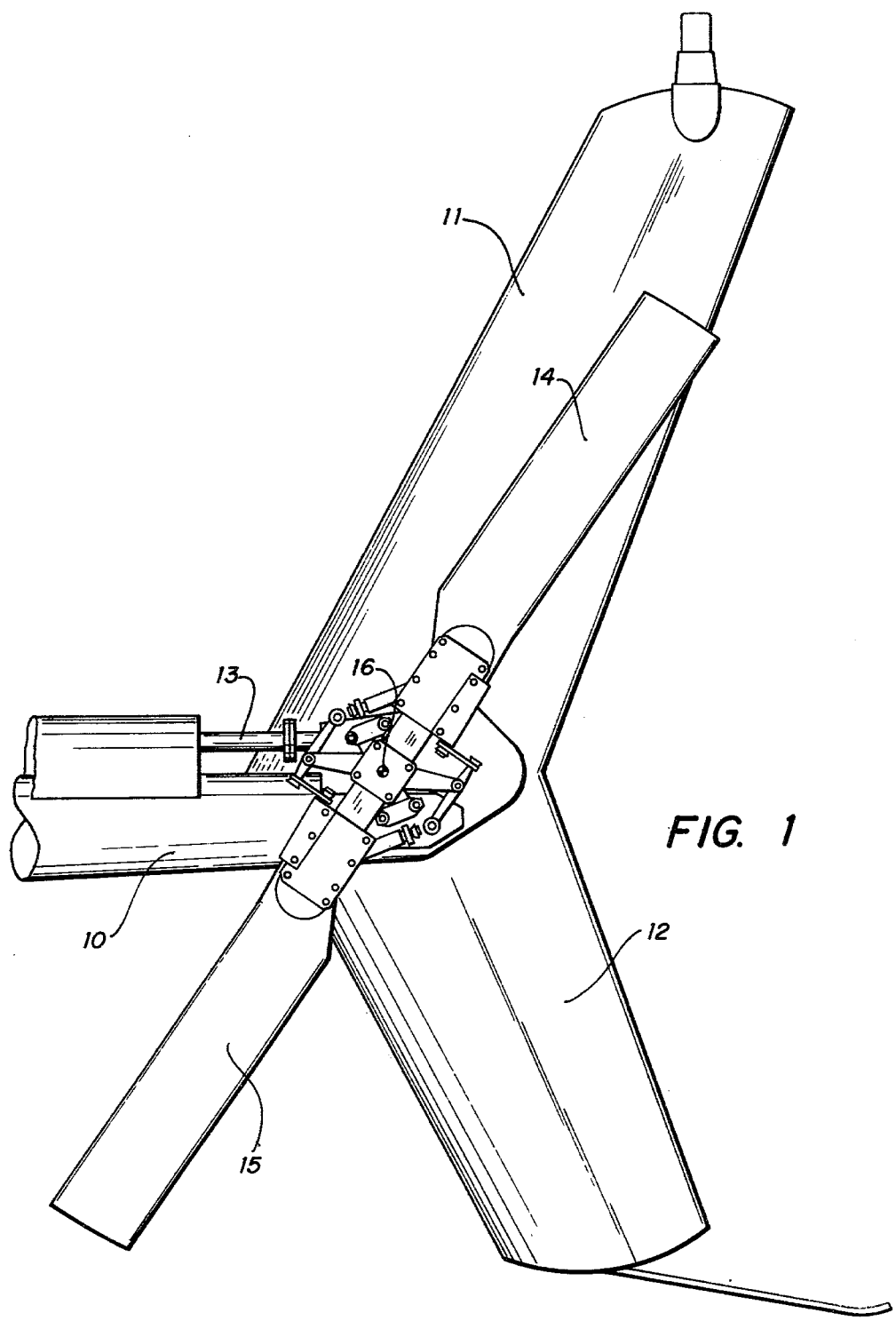
FIG. 1 is a side view of an installation embodying the tail rotor of the present invention.
Figure 2:
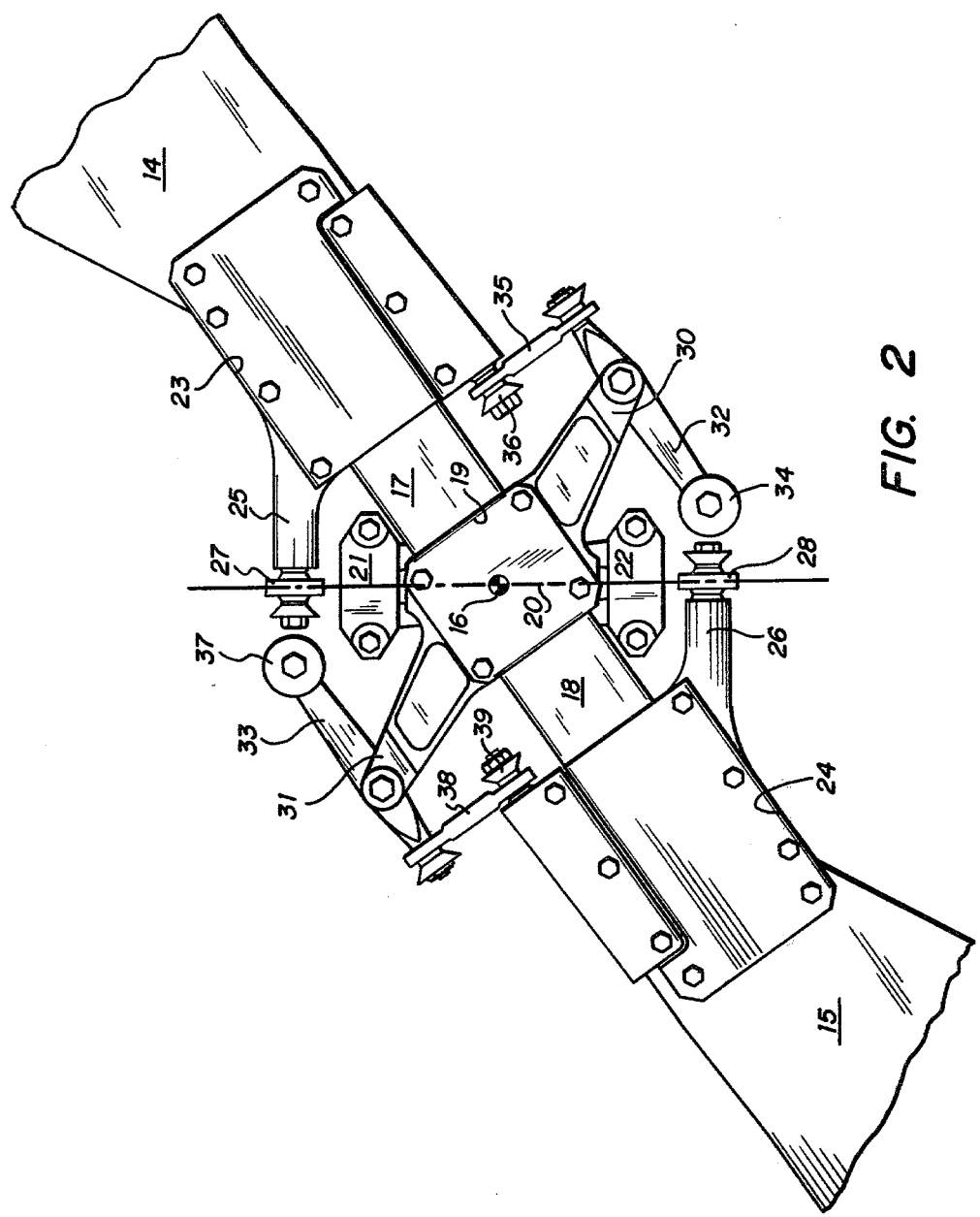
FIG. 2 is an enlarged view of the hub and blade root section of the rotor of FIG. 1.

FIGS. 1 and 2

FIG. 1 illustrates a tail rotor installed on the tail boom 10 of a helicopter at one side of fin 11, 12. A tail mast, not shown, is driven by way of conventional gearing from a shaft 13. Rotor blades 14 and 15 are mounted for rotation about an axis 16. Each rotor blade comprises a flat strap of tension-bearing spanwise-extending fibers having twist sections 17 and 18, FIG. 2. The portion between the twist sections is clamped in a hub clamp 19 mounted for teetering action about an axis 20. Preferably, elastomeric bearings 21 and 22 are employed to mount clamp 19 to teeter on axis 20. The blade includes a one piece hub/flexure/spar structure made of unidirectional fiber strands. Blade sections 14 and 15 comprise fiber straps which include twist sections 17 and 18 on opposite sides of a central hub section and extending beyond the twist sections to the tip of blades 14 and 15.

A pitch horn grip 23 is connected at its outboard margin to the root of the blade section 14. A grip 24 is likewise connected to the root section of blade 15. Grips 23 and 24 are hollow and encompass parts of the twist sections 17 and 18. A pitch horn 25 extends from grip 23 and a pitch horn 26 extends from grip 24. The pitch linkages 27 and 28 are positioned at a negative delta$_3$ location (up flap-up pitch) at points corresponding with the virtual hinges of the twist sections 17 and 18, respectively.

Two struts 30 and 31 form a part of hub clamp 19 and extend outward, generally in the chord planes of the twist sections 17 and 18. An arm 32 is mounted on the end of strut 30. An arm 33 is mounted on the end of strut 31. Arm 32 has a weight 34 on one end thereof and is coupled at the other end thereof by way of a link 35 to a stub shaft 36 which extends inward from the side of grip 23 opposite the pitch horn 25. Similarly, a weight 37 is mounted on arm 33, pivoted at a mid point on strut 31. The opposite end of the arm 33 is coupled by a link 38 to a stub shaft 39 extending inward from the side of grip 24 opposite pitch horn 26.

In operation of the rotor thus far described, the blade will teeter on axis 20. It also undergoes flapping action by beam bending in the twist sections 17 and 18. It also undergoes pitch change by twisting the twist sections 17 and 18 in response to input through the pitch horns 25 and 26. Control input motions are then augmented by forces produced by the centrifugal weights 34 and 37 to amplify any pitch change command through links 35 and 38.

One of the advantages of the construction embodied in the present invention is the provision of the two-bladed rotor with flapping freedom without the necessity of providing shear bearings to react to pitch link loads. Grips 23 and 24 are secured at their outboard margins only to the roots of blade sections 14 and 15, respectively, and form a torque box which encases outboard portions of the twist sections 17 and 18 but do not contact the twist sections. Thus, no shear reaction bearings are used.

In the details of the construction now to be described, it will be seen that unique structure is provided to permit use of a single two-bladed flapping rotor of simple construction.

FIGS. 3-7

Referring now to FIG. 3, the blade construction is illustrated without the hub clamp and the grip. More particularly, the particular rotor embodiment illustrated in FIG. 3 has a length of about 62 inches. A flat strap, preferably of fiberglass, forms the twist sections 17 and 18. The straps preferably are of about the same width for the full length of the blade section. As best shown in FIG. 4, the strap has a thickened center section 40 graded into a somewhat thinner twist section 17, and then is divided into approximately half thickness straps to form an upper blade spar 14a and a lower blade spar 14b. A filler wedge or FIG. 17d, FIG. 4, preferably is formed at the point of division of the fibers to form spars 14a and 14b. FIG. 17d preferably is a wedge-shaped body which comprises fibers extending chordwise to prevent splitting at the point of twist. The fiberglass straps forming spars 14a and 14b become progressively thinner as they approach the blade tip. FIG. 5 illustrates a preferred strap layup sequence where it will be noted that the plys are interleaved and are variable in length. The thickened section 40 at the center of the strap is formed by the addition of a plurality of the short layers, FIG. 5, whereas all of the rest of the layers extend through the twist section and then selectively are terminated at points lying beyond grips 23 and 24 and toward the tip of each blade. It will be noted that the outer layers 14c and 14d extend the full length of the blade, and thus form the outer layer of the upper and lower spars 14a and 14b. The thickened hub section 40 is thus adapted to be secured in hub clamp 19.

Table I specifies the length of the plys, FIG. 5, numbered from outside center. A typical embodiment of the invention is indicated in Table I. Note that the top, center, and bottom plys (37.00 inches) provide for a 74-inch blade. End sections of such a blade are trimmed off to form a 62-inch length blade, leaving specimens for test purposes.

TABLE I

| Ply | X |
|---|---|
| 1 | 37.00 |
| 2 | 10.60 |
| 3 | 1.43 |
| 4 | 25.60 |
| 5 | 1.59 |
| 6 | 13.60 |
| 7 | 1.76 |
| 8 | 22.60 |
| 9 | 1.98 |
| 10 | 16.60 |
| 11 | 2.33 |
| 12 | 19.60 |
| 13 | 2.68 |
| 14 | 37.00 |

In a preferred embodiment of the invention, the spars are made of fiberglass material such as manufactured by 3M, St. Paul, Minn., and identified as SP250SF1, Unidirectional Fiberglass Straps. Each such ply is 0.009 inches thick. Fiberglass plys such as manufactured and sold by U.S. Polymeric, Santa Clara, Calif., and identified as Catalog No. E735, Fiberglass Cloth, has been found to be satisfactory.

It is to be noted, however, that other fibrous materials may be employed, such as graphite, kevlar 49 or laminated metal fibers.

Figure 6:
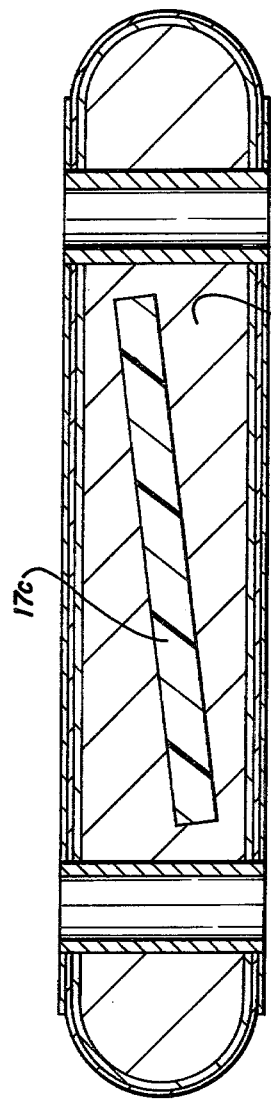
FIG. 6 is a sectional view taken along lines 6—6 of FIG. 3.

FIG. 6 illustrates a section taken through the blade of FIG. 3 along lines 6—6 and show the blade root block through which the strap 17 passes before division thereof to form the upper and lower spars 14a and 14b of FIG. 3. The root blocks provide structure to which the grips may be attached. The unitary section 17c, as it passes into the root block 41, is twisted at a small angle, shown to be 8°. Thus, the chord plane of blade sections 14 and 15 are angled in nose-up sense with respect to each other and with respect to the plane of the hub clamp 19.

Figure 7:
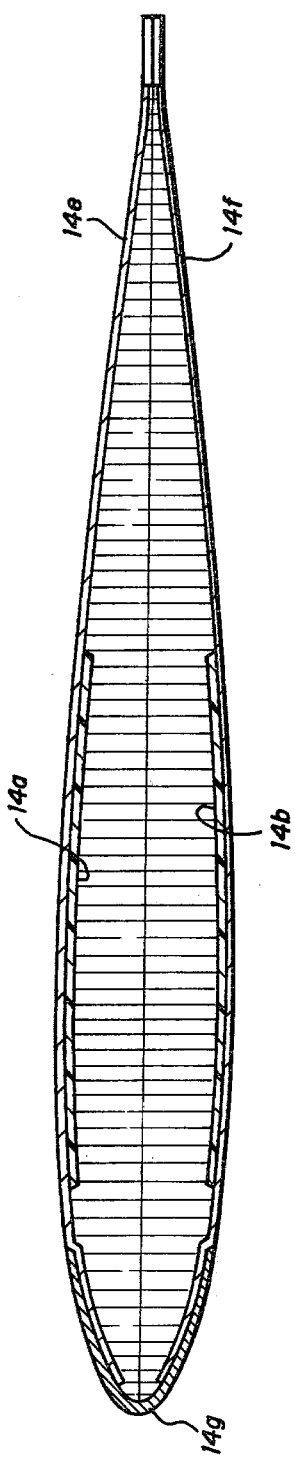
FIG. 7 is a sectional view taken along lines 7—7 of FIG. 3.

FIG. 7 illustrates the blade in section taken along lines 7—7 of FIG. 3. It will be seen that the spar sections 14a and 14b are integrated into a structure wherein honeycomb body material is provided of a proper shape and over which skins 14e and 14f are secured. A stainless steel abrasive nose spar or strip 14g covers the leading edge of the blade. As shown in FIG. 3, the abrasive strip extends from a point slightly outboard of the root block to the tip of the blade.

Having described the invention in connection with certain specific embodiments thereof, it is to be understood that further modifications may now suggest themselves to those skilled in the art and it is intended to cover such modifications as fall within the scope of the appended claims.

We claim:

1. A structural member for helicopter tail rotor, comprising:

a unitary thin flat tension-bearing strap of integrated fibers extending span-wise substantially uniform in width and including a central section adapted for attachment to a hub on a helicopter tail mast with adjacent flex sections thinner than the central section and positioned between said central section and blade root locations, said straps being divided substantially equally outboard of said blade root locations to form upper and lower parallel spars, an upper and lower spar extending from the region of each of said blade root locations to blade tip locations to provide half-thick reinforcing spars parallel to each other and spaced apart along the upper and lower surfaces of the blade bodies for incorporation into and strengthening of the blade bodies.

2. A tension bearing member for incorporation into a tail rotor of a helicopter comprising:

a unitary molded fiber strap unit having spaced thin flat twist sections on opposite ends of a flat central anchor section, said strap having a pair of parallel blade spars extending away from each of said twist sections and each pair being of substantially the same width as said twist sections and about one-half thickness and extending in diametrically opposite directions beyond the ends of said twist sections to form two pairs of confronting spars spaced apart in an upper and lower relation for incorporation into blade bodies.

3. The combination set forth in claim 1 wherein the planes of said flex sections and the planes of said spars are oriented at predetermined nose-up twist angles, one relative to the other.

4. The combination set forth in claim 1 wherein said strap is characterized by sheets terminating inboard of said flex sections, interspersed with sheets terminating outboard of said flex sections to form flex sections thinner than the center portion of said strap.

5. The combination set forth in claim 1 where said sheets extending outboard of said flex sections are graded in lengths with the top and bottom sheets extending to said blade tip locations.

6. The combination set forth in claim 1 wherein the one top, two middle, and one bottom sheet terminate at said blade tip locations and comprise top and bottom layers for said spars.

7. The member of claim 2 in which the planes of said flex sections and the planes of said spars differ.

8. The member of claim 7 in which said spars are canted in nose-up sense of about 8°.

* * * * *

UNITED STATES PATENT AND TRADEMARK OFFICE
CERTIFICATE OF CORRECTION

PATENT NO. : 4,306,837

DATED : December 22, 1981

INVENTOR(S) : Vas H. Brogdon; Cecil E. Covington; Richard E. Wheelis

It is certified that error appears in the above—identified patent and that said Letters Patent is hereby corrected as shown below:

Column 2, line 65, change "FIG." (first occurrence) to --fid--.

line 67, change "FIG." to --Fid--.

Signed and Sealed this

Sixth Day of April 1982

[SEAL]

Attest:

GERALD J. MOSSINGHOFF

Attesting Officer     Commissioner of Patents and Trademarks